May 7, 1940.  M. L. GOLDBERG  2,200,167
INDICATOR FOR NIGHT DRIVING OF AUTOMOBILES
Filed April 1, 1939
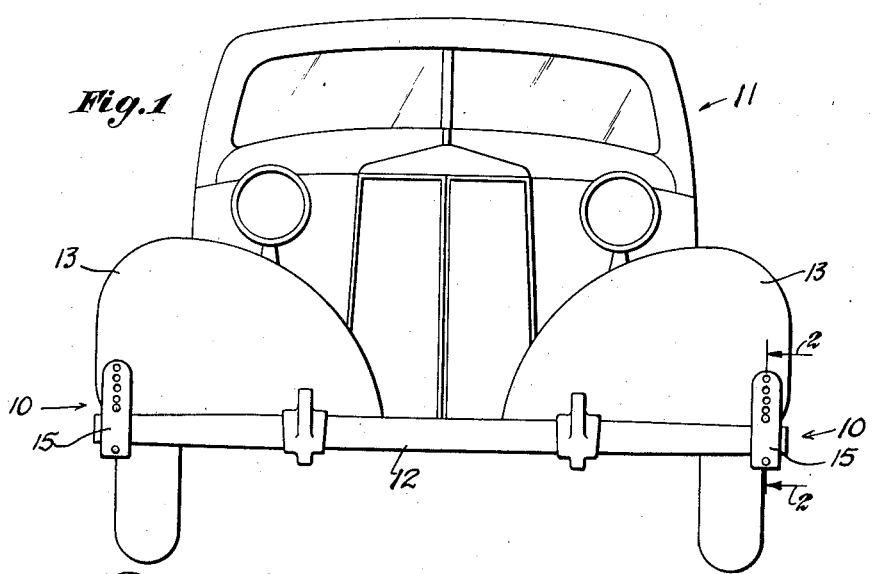
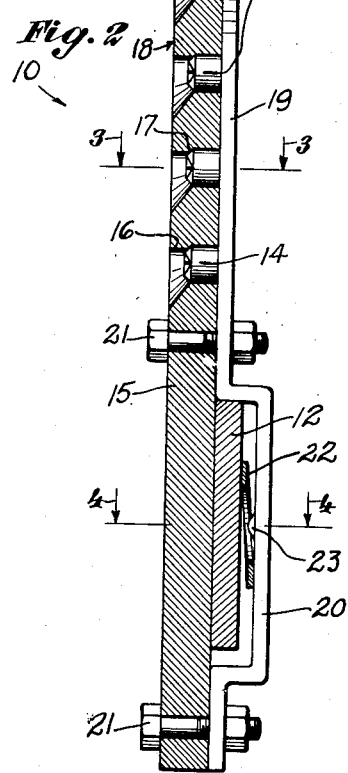
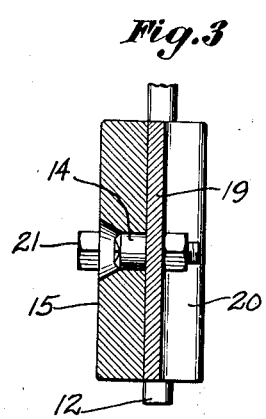
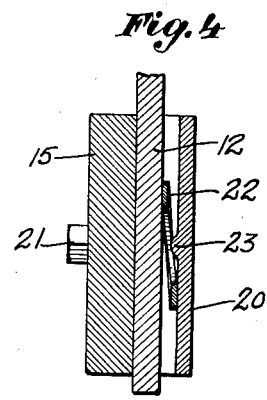
Morris L. Goldberg INVENTOR.
BY Chris Shumacher ATTORNEY.

Patented May 7, 1940

2,200,167

UNITED STATES PATENT OFFICE 2,200,167

INDICATOR FOR NIGHT DRIVING OF AUTOMOBILES

Morris L. Goldberg, Kiamesha, N. Y.

Application April 1, 1939, Serial No. 265,440

1 Claim. (Cl. 88—81)

This invention relates to indicators for the night driving of automobiles.

One object of the invention is to provide an improved device to indicate in night driving the maximum width of an automobile, so that a motorist coming from the opposite direction shall know how much clearance is required to permit the automobiles to safely pass each other.

It is well known that in night driving, one oftentimes sees only the headlights of an opposite car and cannot clearly see the outline of the body of the car. Since the headlights are spaced apart at different distances for different cars, there is nothing by which to gage the width of the car or the amount of clearance required to safely pass it. If the roadway be narrow, or if one is rounding a turn in the road, the problem oftentimes becomes acute, and this results in considerable worry to the cautious driver.

It is therefore an object of the invention to provide means for meeting this problem and for increasing the safety in night driving, and for facilitating the rapid progress of traffic by eliminating this source of uncertainty.

Another object of the invention is to provide a device as set forth having few and simple parts and which is inexpensive to make, easy to assemble, neat and compact, and durable, reliable and efficient in use in all kinds of weather.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated in the annexed drawing, wherein like parts are designated by the same reference characters throughout the several views.

In the drawing:

Figure 1 is a view in front elevation showing the device of the invention applied to an automobile.

Fig. 2 is a vertical sectional view of the device on an enlarged scale, on the line 2—2 of Fig. 1.

Figs. 3 and 4 are sectional views taken on the lines 3—3 and 4—4 of Fig. 2.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention and showing the same in a typical installation on any automobile 11. The device 10 may be suitably mounted on a portion of the car, preferably on the bumper 12 thereof, and may be considered as comprising said bumper. This bumper extends horizontally at the front of the automobile, so that its length is equal to the maximum width of the car, as indicated in this instance by the fenders 13.

Mounted on a support carried by the bumper 12 are a plurality of elements 14 of high light reflecting and diffusing quality, which may be made of glass or other suitable material, faceted at the front face thereof, or otherwise treated so as to be bright and highly lustrous when light from an approaching vehicle impinges thereon. While the elements 14 may be of any suitable color, they are preferably green.

These elements 14 are mounted adjacent to the extreme ends of the bumper 12 to thus serve to indicate to an approaching motorist the maximum or substantially the full width of the automobile.

In order to permit the elements 14 to be readily applied to any existing bumper, I prefer to mount said elements in an upright strip member 15 which is readily attachable to the bumper. The member 15 may have openings 16 therethrough, affording annular seats 17, to prevent removal of the reflector elements at the front, while permitting free insertion of the reflector elements at the rear of each member 15.

To avoid breakage of the reflector elements 14 in the event of collision, the latter are set back of the front face 18 of the member 15, as shown.

To safeguard against the settling of snow on the reflector elements, the openings therefor diverge in a generally forward and downward direction from the seats 17, to permit ample visibility, and yet to partially shield the reflector elements.

For mounting the member 15, a single means is provided which may serve the added purpose of retaining the reflector elements 14 in their openings 16. Accordingly, a bar 19 may extend along the rear face of each member 15, and may desirably be offset at 20 to clamp around the bumper 12 in cooperation with the member 15. For example, bolts 21 may interconnect the members 15 and 19, to thereby clamp the device on the bumper 12 and secure the bar 19 in retaining position for the reflector elements. It will be noted that the arrangement is such that any excessive tightening of the bolts 21 cannot cause breakage of the reflector elements.

As thus arranged and constructed it will be noted that the device 10 consists of a minimum of parts. Since the bolts 21 may be standard only the parts 14, 15 and 19 need be manufactured. Moreover, the assembling of the parts requires merely a simple manipulation of the bolts.

If the member 15 or the bar 19 or both be made sufficiently rugged they may serve as extension or supplemental bumper portions for the bumper 12, to afford protection for otherwise exposed parts of the fenders 13.

In certain cases it may be desirable to afford a vibrational movement of the member 15, for instance, at a period different than that of the automobile, to facilitate the shaking off of snow that may tend to obscure the reflector elements. For this purpose, the clamp section at 20 may have suitable clearance with the bumper, and an expansion coil spring or split washer 22 may act between the bumper and the offset 20, with the latter having a projection at 23 in the center of the spring for retaining the latter. The spring may be of such tension as to be responsive to vibration of the car caused by irregularities in the roadway.

Aside from the foregoing, the spring 22 may permit the device to be secured to bumpers of different thicknesses, and may be made sufficiently powerful to assure a rigid mounting.

It will thus be seen that I have provided a simple and inexpensive device, which will greatly increase the safety and convenience of night driving by indicating the clearance space required in passing an automobile.

I claim:

A device including an elongated member adapted to be mounted on an automobile bumper so as to extend cross-wise of the bumper with a portion of said member projecting above the bumper, said portion of the member having a plurality of longitudinally alined openings therethrough, each having a rearward facing seat adapted to receive a reflector element removably inserted into said opening at the rear end thereof and resting on said seat so as to be visible through the front end of the opening, said reflector element being thus located remotely from the bumper, a relatively resilient metal bar extending along the rear face of said member, and means movably interconnecting said member and said bar above and below the bumper to clamp the member to the bumper, said member and said bar co-operating with each other to provide an offset clamp section for receiving the bumper so that the member and the bar otherwise lie substantially in face to face contact with each other longitudinally thereof, said bar extending along said portion of the member to provide a backing for the reflector elements to retain the latter in said openings, said portion of the member and said bar being otherwise free of each other so that an excessive tightening of said means will not cause breakage of the elements.

MORRIS L. GOLDBERG.